US007266467B1

(12) United States Patent
Peake

(10) Patent No.: US 7,266,467 B1
(45) Date of Patent: Sep. 4, 2007

(54) METHOD TO CALIBRATE HYDRAULIC FLOW VALVES IN SITU

(75) Inventor: John William Peake, San Francisco, CA (US)

(73) Assignee: Trimble Navigation, Limited, Sunnyvale, CA (US)

( * ) Notice: Subject to any disclaimer, the term of this patent is extended or adjusted under 35 U.S.C. 154(b) by 0 days.

(21) Appl. No.: 11/363,120

(22) Filed: Feb. 25, 2006

(51) Int. Cl.
*G01F 1/58* (2006.01)

(52) U.S. Cl. ........................ 702/114; 702/100; 73/1.16; 73/1.36; 73/195; 73/196; 73/197; 73/198

(58) Field of Classification Search ................ 702/114, 702/100; 73/1.36, 1.34, 1.16, 195, 197, 198, 73/1.67, 1.64
See application file for complete search history.

(56) References Cited

U.S. PATENT DOCUMENTS 4,102,175 A * 7/1978 Foster ........................ 73/1.67
4,466,337 A 8/1984 Eiler
6,721,674 B2 * 4/2004 Borzsonyi ................... 702/100
6,955,072 B2 * 10/2005 Zarkar et al. ................ 73/1.36

* cited by examiner

*Primary Examiner*—John Barlow
*Assistant Examiner*—Hien Vo
(74) *Attorney, Agent, or Firm*—Boris G. Tankhilevich

(57) ABSTRACT

A method for performing system characterization in situ for a system comprising a actuator controlled by a proportional controller. The system includes a quasi-linear region characterized by a slope of the system response and by a delay in the quasi-linear region of the system. The system includes at least one dead zone (DZ). The method comprises the following steps: (A) applying an input waveform U(t) to an input of the system comprising the actuator controlled by the proportional controller; (B) measuring waveform characteristics of an output waveform $\dot{X}(t)$ in a relevant region of the output waveform; (C) calculating a set of parameters selected from the group consisting of: {at least one DZ; a system delay; and a slope of the system response in the quasi-linear region of said system} based on the measured waveform characteristics of the output waveform; and (D) performing the system characterization in situ by using the set of calculated parameters selected from the group consisting of: {at least one DZ; the system delay; and the slope of the system response in the quasi-linear region of the system}.

27 Claims, 7 Drawing Sheets

METHOD TO CALIBRATE HYDRAULIC FLOW VALVES IN SITU

BACKGROUND OF THE INVENTION

1. Field of the Invention

The present invention is in the field of position tracking and machine control systems, and, more specifically, is directed to a method to calibrate hydraulic flow valves in situ.

2. Discussion of the Prior Art

A prior art four-way valve-controlled single-rod linear actuator is one of the most basic hydraulic control systems—a typical steering system. This system uses a standard four-way valve to control the output characteristics of a single-rod linear actuator. The linear actuator is typically used to generate translational output motion for hydraulic control systems. The basic construction of this actuator can be described by a simple piston-cylinder arrangement. A fixed or variable displacement pump provides an adequate hydraulic pressure power source for the valve-controlled system.

The four-way valve-controlled single-rod linear actuator can be described by using a linear equation of motion. The most practical way to enforce the control law is to use an electro hydraulic position control for the four-way spool valve coupled with a microprocessor that is capable of reading the feedback information and generating the appropriate output signal for the valve actuator.

However, when the valve dead zone (DZ) is taken into account, it results in significant nonlinearity of the four-way valve-controlled single-rod linear actuator. Therefore, the linear equation of motion for the controlled system (without dead zone) is not applicable in this non-linear situation, and can not be used to accurately predict the behavior of the nonlinear system, especially around the dead zone DZ.

The non-linear effect of the dead zone (DZ) of the quasi-proportional controller valve on the equation of motion of a non-linear system is also dependent on parameters of the non-linear system, such as friction in an actuator, friction in an implement the pump pressure response, etc.

One way to deal with this non-lineartity problem is to calibrate the entire non-linear system in situ.

SUMMARY OF THE INVENTION

The present invention discloses the method for performing a system characterization in situ for a four-way valve controlled linear actuator with an inverse dead zone compensation.

One aspect of the present invention is directed to a method for performing system characterization in situ for a system comprising an actuator controlled by a proportional controller.

In one embodiment of the present invention, the system includes a quasi-linear region characterized by a slope of the system response and by a delay in the quasi-linear region of the system. In one embodiment of the present invention, the system includes at least one dead zone (DZ).

In one embodiment of the present invention, the method comprises the following steps: (A) applying an input waveform U(t) to an input of the system comprising an actuator controlled by a proportional controller; (B) measuring waveform characteristics of an output waveform $\dot{X}(t)$ in a relevant region of the output waveform, wherein the relevant region of the output waveform is determined by a first set of parameters selected from the group consisting of: {a noise level; drift of the actuator; friction properties of the actuator; and characteristics of the input waveform}; (C) calculating a second set of parameters selected from the group consisting of: {at least one dead zone (DZ); a system delay; and a slope of the system response in the quasi-linear region of the system} based on the measured waveform characteristics of the output waveform; and (D) performing the system characterization in situ by using the second set of calculated parameters selected from the group consisting of: {at least one DZ; the system delay; and the slope of the system response in the quasi-linear region of the system}.

In one embodiment of the present invention, the step (A) further comprises the following steps: (A1) selecting the proportional controller from the group consisting of: {an electro-hydraulic valve with a dead zone (DZ); a four-way under lapped spool valve; and an electric motor with a dead zone due to the friction of the bearings}; (A2) selecting the actuator from the group consisting of: {a linear actuator system including a linear region; and an actuator including a quasi-linear region}; and (A3) applying the input waveform U(t) to the input of the present system comprising the actuator controlled by the proportional controller.

In one embodiment of the present invention, the step (A) further comprises the following steps: (A4) providing the system selected from the group consisting of: {an implement position controlled system; and a steering system}, wherein the implement is selected from the group consisting of: {an implement of a tractor; a blade of a bulldozer; and an excavation arm}; and (A5) applying the input waveform U(t) to the input of the system.

In one embodiment of the present invention, the step (A) further comprises the following step: (A6) applying an input waveform U(t) to the input of the linear actuator system controlled by the electro-hydraulic valve with the dead zone (DZ); wherein a period of the input waveform having the input waveform rate of changing over time is substantially greater than a system response time; and wherein the system response time is selected from the group consisting of: {a transport time delay; and a first order time delay}.

In one embodiment of the present invention, the step (A) further comprises the following step: (A7) applying a slow changing triangle current input waveform U(t) to the input of the linear actuator system controlled by the electro-hydraulic valve with the dead zone (DZ), wherein a period of the slow changing triangle current input waveform is substantially greater than the system response time.

In one embodiment of the present invention, the step (B) further comprises the following steps: (B1) measuring waveform characteristics of the output waveform $\dot{X}(t)$ in the relevant region of the output waveform; wherein the relevant region of the output waveform is determined by a first set of parameters selected from the group consisting of: {the noise level; drift of the actuator; friction properties of the actuator; and characteristics of the input waveform}; and (B2) filtering the output waveform $\dot{X}(t)$ to decrease the noise level to a residual noise level; wherein the residual noise level is less than a predetermined noise level; and wherein an accuracy of the second set of calculated parameters selected from the group consisting of: {the noise level; drift of the actuator; friction properties of the actuator; and characteristics of the input waveform} is determined by the predetermined noise level.

In one embodiment of the present invention, the step (B2) further comprises the following step: (B2, 1) using a low pass filter having a low pass filter time response.

In one embodiment of the present invention, the step (B) further comprises the following step: (B3) determining a relevant zone for measurements by setting a set of predetermined thresholds based on preliminary measurements of a third set of parameters selected from the group consisting of: {the level of residual noise; the drift; the friction properties; the system response time; the filter time response; and the characteristics of the input waveform}.

In one embodiment of the present invention, the (B3) further comprises the following step: (B3, 1) setting a low threshold level; wherein the low threshold level is determined by a fourth set of parameters selected from the group consisting of: {the level of residual noise; the drift; and position disturbances}.

In one embodiment of the present invention, the (B3) further comprises the following step: (B3, 2) setting a high threshold level; wherein the high threshold level is determined by a fifth set of parameters selected from the group consisting of: {a slope of the input waveform; the system response time; the filter time response; and a residual noise level of the input waveform}. In one embodiment of the present invention, wherein the system comprises a linear actuator controlled by an electro-hydraulic valve, the method further comprising the steps (D-L) of the following algorithm $\aleph$: (D) determining limits $\dot{X}_{min}$ and $\dot{X}_{MAX}$ on the output waveform $\dot{X}(t)$ based on a sixth set of parameters selected from the group consisting of: {a noise level; drift; measured filter time constant; and a group delay}; (E) applying a substantially slow input waveform U(t) with a slope $\Delta U/\Delta t$ to an input of the valve; wherein the substantially slow input waveform comprises a linearly increasing substantially slow ramp waveform; and wherein the linearly increasing substantially slow ramp waveform is substantially slow comparatively to a hydraulic response time and to a filter time constant; and wherein the input waveform includes a maximum $U_{max}$ and a minimum $U_{min}$; (F) filtering the input waveform U(t) and the output waveform $\dot{X}(t)$ to obtain a filtered output waveform $<\dot{X}(t)>$ and a filtered input waveform $<U(t)>$; (G) if the filtered $<\dot{X}(t)>$ goes above said $\dot{X}_{MIN}$, storing the filtered $<\dot{X}(t)>$ and the filtered $<U(t)>$ until the filtered $<\dot{X}(t)>$ goes above the $\dot{X}_{MAX}$; (H) applying a substantially slow input waveform U(t) with a slope (−) $\Delta U/\Delta t$ to the input of the valve; wherein the substantially slow input waveform comprises a linearly decreasing substantially slow ramp waveform; and wherein the linearly decreasing substantially slow ramp waveform is substantially slow comparatively to the hydraulic response time and to the filter time constant; (I) if the $<\dot{X}(t)>$ goes below said $\dot{X}_{MAX}$, storing said filtered $<\dot{X}(t)>$ and said filtered $<U(t)>$ until said filtered $<\dot{X}(t)<$ goes below said $\dot{X}_{MIN}$; (K) fitting a first line to the stored filtered $<\dot{X}(t)>$ and fitting a second line to the stored filtered $<U(t)>$ to measure waveform characteristics of the filtered $<\dot{X}(t)>$ output waveform and the filtered $<U(t)>$; wherein the first fitting line is selected from the group consisting of: {an over determined linear regression; a critically determined two-point line fit}; and wherein the second fitting line is selected from the group consisting of: {an over determined linear regression; a critically determined two-point line fit}; and (L) based on the measured waveform characteristics of the filtered $<\dot{X}(t)>$ output waveform and the filtered $<U(t)>$, calculating the second set of parameters selected from the group consisting of: {the DZ; the system delay; and the slope of the system response in the linear region of the system} to perform the system characterization in situ.

In one embodiment, the method of the present invention further comprises the following step: (M) applying the steps (D-L) of the algorithm $\aleph$ to each input of the controller.

In one embodiment, the method of the present invention further comprises the following step: (N) combining the results obtained in the step (M).

In one embodiment, the method of the present invention further comprises following steps: (O) applying integer N times the steps (D-L) of the algorithm $\aleph$ to each input of the controller; and (P) averaging the results obtained in the step (O).

In one embodiment, the method of the present invention further comprises the following step: (R) modifying the algorithm $\aleph$ by adaptively changing the $U_{max}$ and the $U_{min}$ of the ramp waveform with the slope $\Delta U/\Delta t$ applied to an input of the valve.

Another aspect of the present invention is directed to an apparatus for performing system characterization in situ for a system comprising a actuator controlled by a proportional controller.

In one embodiment, the apparatus of the present invention comprises: a means (A) for applying an input waveform U(t) to an input of the system comprising the actuator controlled by the proportional controller; a means (B) for measuring waveform characteristics of an output waveform $\dot{X}(t)$ in a relevant region of the output waveform; wherein the relevant region of the output waveform is determined by a first set of parameters selected from the group consisting of: {a noise level; a drift of the actuator; friction properties of the actuator; and characteristics of the input waveform}; a means (C) for calculating a second set of parameters selected from the group consisting of: {at least one DZ; a system delay; and a slope of the system response in the quasi-linear region of the system} based on the measured waveform characteristics of the output waveform; and a means (D) for performing the system characterization in situ by using the second set of calculated parameters selected from the group consisting of: {at least one DZ; the system delay; and the slope of the system response in the quasi-linear region of the system}.

In one embodiment of the present invention, the means (A) further comprises: a means (A1) for selecting a proportional controller from the group consisting of: {an electro-hydraulic valve with a dead zone (DZ); a four-way under lapped spool valve; and an electric motor with a dead zone due to the friction of the bearings}; a means (A2) for selecting an actuator from the group consisting of: {a linear actuator system including a linear region; and the actuator including the quasi-linear region}; and a means (A3) for applying the input waveform U(t) to the input of the system comprising an actuator controlled by a proportional controller.

In one embodiment of the present invention, the means (A) further comprises: a means (A4) for selecting the system from the group consisting of: {an implement position controlled system; and a steering system}; a means (A5) for selecting the implement from the group consisting of: {an implement of a tractor; a blade of a bulldozer; and an excavation arm}; and a means (A6) for applying the input waveform U(t) to the input of the system.

In one embodiment of the present invention, the means (A) further comprises: a means (A7) for applying an input waveform U(t) to the input of the linear actuator system controlled by the electro-hydraulic valve with the dead zone (DZ); wherein a period of the input waveform having the input waveform rate of changing over time is substantially greater than a system response time; and wherein the system response time is selected from the group consisting of: {a transport time delay; and a first order time delay}.

In one embodiment of the present invention, the means (A) further comprises: a means (A8) for applying a slow changing triangle current input waveform U(t) to the input of the linear actuator system controlled by the electro-hydraulic valve with the dead zone (DZ); wherein a period of the slow changing triangle current input waveform is substantially greater than the system response time.

In one embodiment of the present invention, the means (B) further comprises: a means (B1) for measuring waveform characteristics of the output waveform $\dot{X}(t)$ in the relevant region of the output waveform; wherein the relevant region of the output waveform is determined by a first set of parameters selected from the group consisting of: {the noise level; drift of the actuator; friction properties of the actuator; and characteristics of the input waveform}; and a means (B2) for filtering the output waveform $\dot{X}(t)$ to decrease the noise level to a residual noise level; wherein the residual noise level is less than a predetermined noise level.

In one embodiment of the present invention, the means (B2) further comprises: (B2, 1) a low pass filter having a low pass filter time response.

In one embodiment of the present invention, the means (B) further comprises: a means (B3) for determining a relevant zone for measurements by setting a set of predetermined thresholds based on preliminary measurements of a third set of parameters selected from the group consisting of: {the level of residual noise; the drift; the friction properties; the system response time; the filter time response; and the characteristics of the input waveform}.

In one embodiment of the present invention, the means (B3) further comprises: a means (B3, 1) for setting a low threshold level; wherein the low threshold level is determined by a fourth set of parameters selected from the group consisting of: {the level of residual noise; the drift; and position disturbances}.

In one embodiment of the present invention, the means (B3) further comprises: a means (B3, 2) for setting a high threshold level; wherein the high threshold level is determined by a fifth set of parameters selected from the group consisting of: {a slope of the input waveform; the system response time; the filter time response; and a residual noise level of the input waveform}.

BRIEF DESCRIPTION OF DRAWINGS

The aforementioned advantages of the present invention as well as additional advantages thereof will be more clearly understood hereinafter as a result of a detailed description of a preferred embodiment of the invention when taken in conjunction with the following drawings.

DETAILED DESCRIPTION OF THE PREFERRED AND ALTERNATIVE EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be comprised within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

A prior art four-way spool valve is widely used flow-control valve in the hydraulic circuitry. This valve is used as a control valve for adjusting the displacement of the variable displacement pump. A four-way spool valve is often used as the main control valve for the entire hydraulic circuit because it simultaneously directs flow to an away from the working implement of the system.

Figure 1:
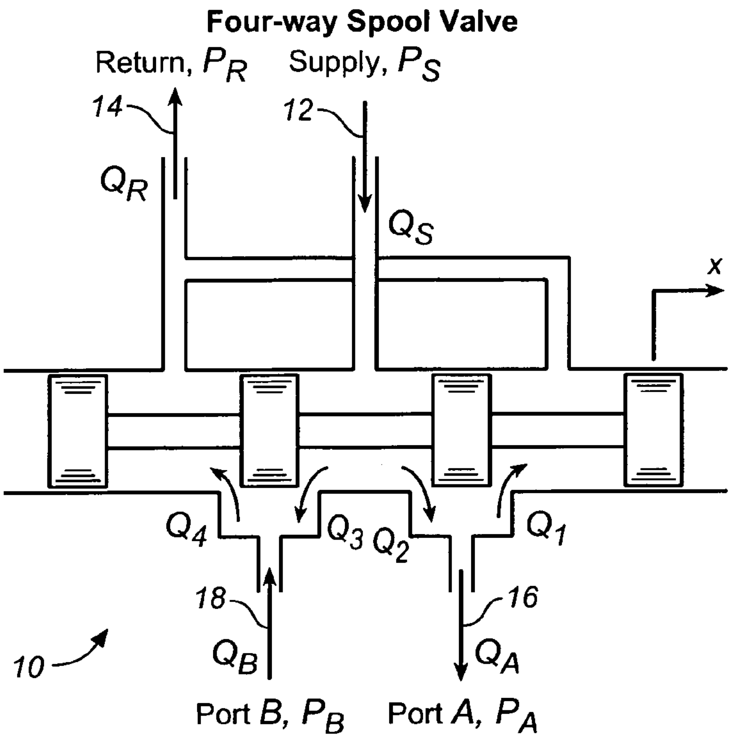
FIG. 1 (PRIOR ART)
FIG. 1 depicts a prior art four-way spool valve with four flow lines.

FIG. 1 shows the prior art four-way spool valve with four flow lines. The supply line 12 is pressured to a level $P_S$, whereas the return line 14 is pressured to the level $P_R$. For the four-way valve, two ports are used for directing flow to and away from the load. These ports are indicated in FIG. 1 by ports A 16 and B 18, which are pressurized to the levels $P_A$ and $P_B$, respectively. To direct flow into port A, the spool valve is moved in the positive x direction, thus facilitating the volumetric flow rate $Q_A$. For this same motion, valve port B is opened to the return line, thus facilitating the volumetric flow rate $Q_B$. The supply flow and return flow are shown in FIG. 1 by symbols $Q_S$ and $Q_R$, respectively. FIG. 1 shows a four-way spool valve that uses open-centered (underlapped) geometry for the metering lands. The port flows shown in FIG. 1 are given by:

$$Q_A=2K_qx-2K_C(P_A-P_S/2)$$

$$Q_B=2K_qx+2K_C(P_B-P_S/2) \quad \text{(Eq. 1)}$$

where $K_q$ and $K_C$ are the flow gain and the pressure-flow coefficient for the entire valve.

Figure 2:
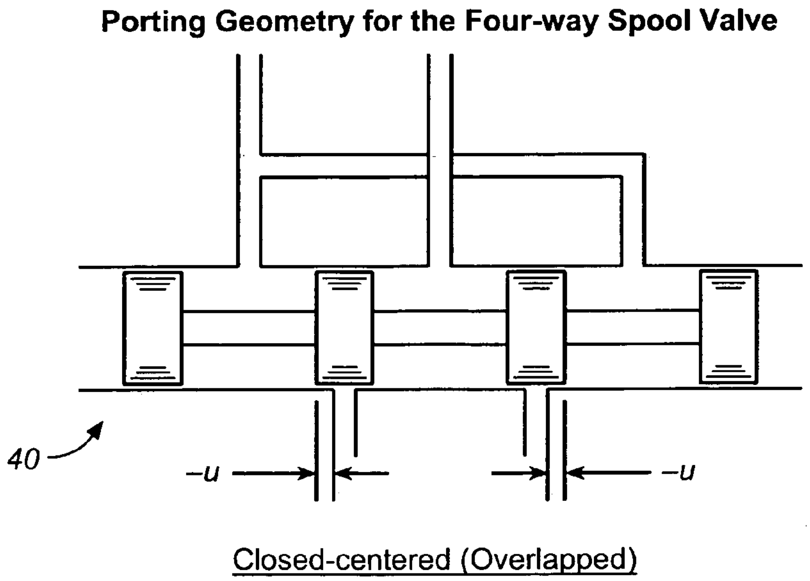
FIG. 2 (PRIOR ART)
FIG. 2 illustrates the closed-centered (overlapped) configuration of a prior art four-way spool valve.

FIG. 2 illustrates the closed-centered (overlapped) configuration 40. The porting of this design is referred to as overlapping porting because the underlapped dimension u is actually negative. This configuration describes a metering land that overlaps the edges of the metering port. The closed-centered design requires the valve to move a distance u before any flow enters or exits the flow ports. This initial movement is referred to as valve dead band (or dead zone DZ) and if without compensation, is generally an undesirable feature for a hydraulic control valve.

Dynamic systems are characterized by time-varying outputs that differ instantaneously from a desired output. This difference between desired and actual output is known as a system error $\epsilon$, which is given by $$\epsilon = x_d - x \quad \text{(Eq. 2)}$$

where x is an actual system's output, and $x_d$ is the desired system output.

The proportional control (P control) is the simplest control that can be used for adjusting the input signal to a dynamic system. The control signal u(t) for the P control can be described as follows:

$$u(t) = K_e \epsilon \quad \text{(Eq. 3)}$$

Here, u(t) is the adjustment input to the dynamic system, and $K_e$ is the proportional controller gain.

Substituting the (Eq. 3) into the error dynamic equation for the second order system (not shown) gives the following error dynamic equation for the P-controlled system:

$$\ddot{\epsilon} + 2\zeta\omega_n\dot{\epsilon} + (\omega_n^2 + K_e)\epsilon = \omega_n^2 x_d \quad \text{(Eq. 4)}$$

where $\zeta$ is the damping ratio, and $\omega_n$ is the undamped natural frequency of the system.

Figure 3:
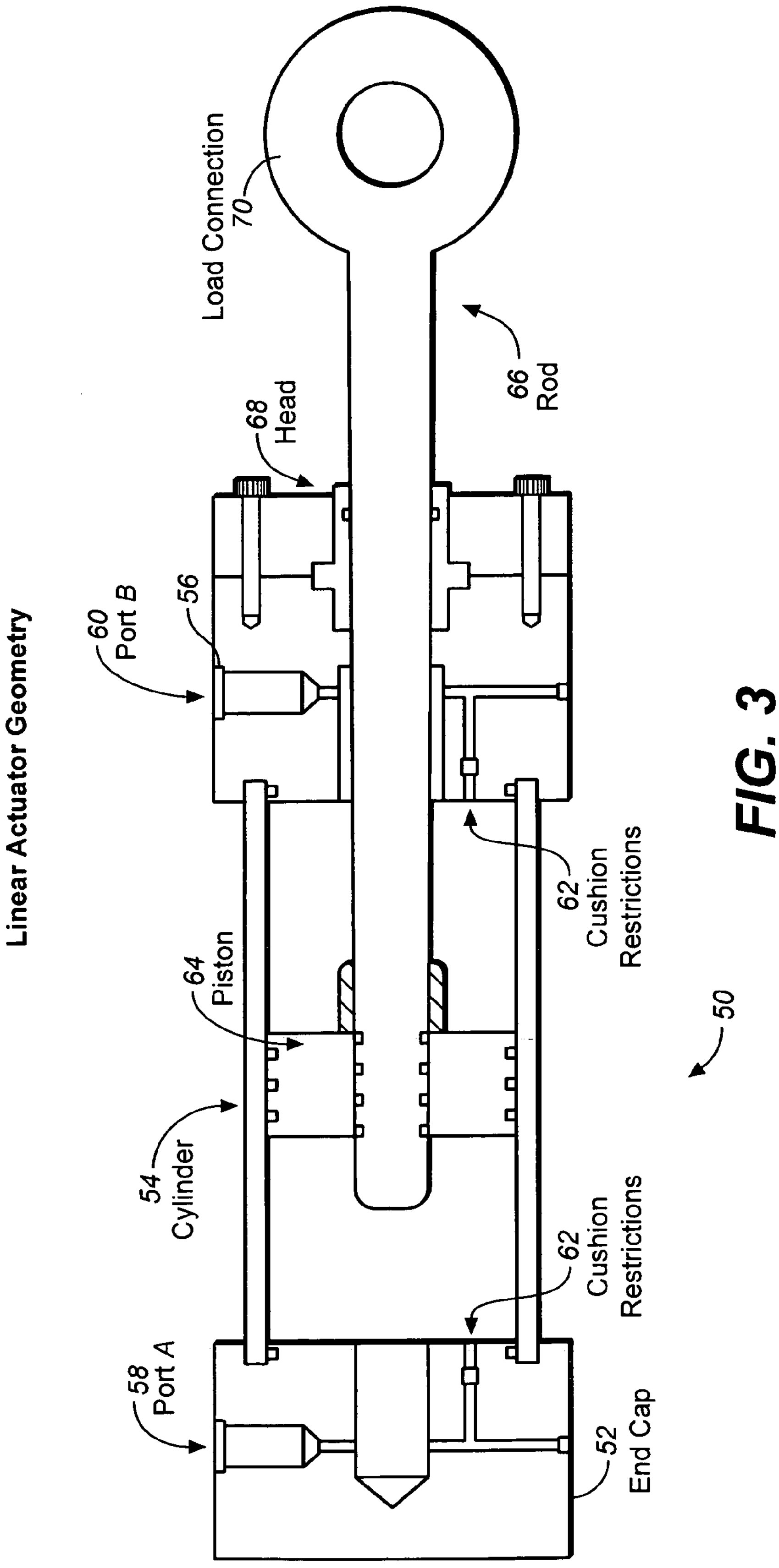
FIG. 3 (PRIOR ART)
FIG. 3 shows a prior art linear actuator geometry.

FIG. 3 shows the cross-section view the prior art linear actuator 50 that is typically used to generate translational output motion for hydraulic control systems. The basic construction of this actuator is described by a simple piston-cylinder arrangement. However, certain machine elements are necessary in practice to guarantee satisfactory performance of this machine. These machine elements include seals, bolts, welded joints, plugs, bearings, threaded rods, and specially machined end caps and housings. Some of these elements are shown in FIG. 3. The two end caps 52 and 56 of the linear actuator are connected to each other by a sealed cylindrical tube 54. These end caps are machined with hydraulic ports that are labeled "Port A" 58 and "Port B" 60. Within each end cap 52 and 56 there is machined geometry that is used for creating a fluid cushion 62 at both ends of the piston 64 stroke. This geometry involves a mechanism for plugging the main flow passage to the port and providing an alternative route for fluid to pass through the cushion restrictions. The piston within the linear actuator is attached to a displacement rod 66 that is supported by a bearing-seal arrangement and contained by the bolted head 68. The load device (not shown) for the hydraulic control system is connected to the rod 66 at the load connection point 70.

The operation of the linear actuator 50 is accomplished by forcing fluid into port A 58, which then causes the piston-rod assembly to move to the right. As the piston 64 moves to the right, the fluid is forced out of port B 60 into the return side of the hydraulic system. As the rod approaches its maximum displacement to the right, the crosshatched cushion geometry that is attached to the piston enters into the annular geometry of the left end cap 58 and plugs the main flow passage to port B 60. The fluid exiting the system then should be routed through the cushion restrictor 62 which then slows down the travel velocity of the piston near the end of the piston stroke. A reverse operation of the linear actuator is achieved by forcing fluid into port B, which then causes the piston-rod assembly to move to the left, Fluid then exits port A 58 and the travel velocity near the end of the stroke is retarded in a fashion described above. The design of the linear actuator 50 of FIG. 3 is considered to be a double-acting (it can be forced in either the right or left direction depending on the direction of fluid through port A or port B), single-rod (it only has one rod and head end of the actuator) configuration.

Figure 4:
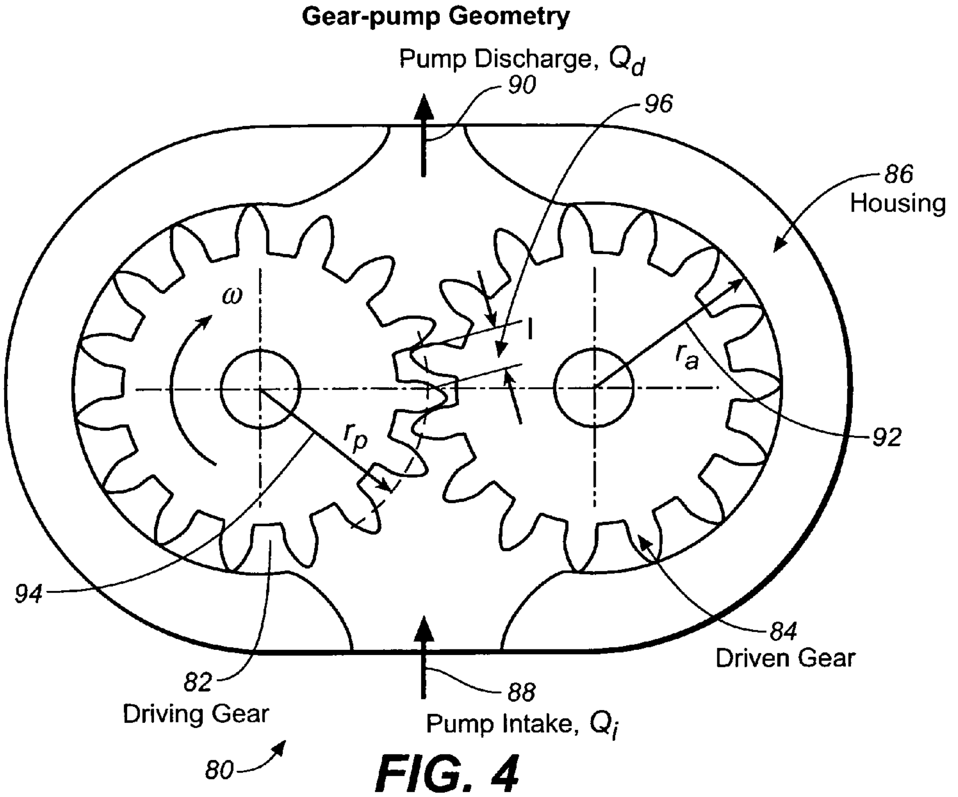
FIG. 4 (PRIOR ART)
FIG. 4 depicts a prior art gear pump geometry that is used as an inexpensive auxiliary power supply for larger hydraulic systems.

A gear pump 80 shown in FIG. 4 is used as an inexpensive auxiliary power supply for larger hydraulic systems. In this capacity, gear pumps tend to be one of the more widely used pump constructions. More specifically, two identical gears 82 (a driving gear) and 84 (a driven gear) both having N involute-shaped teeth, are in mesh with one another. Both gears rotate in opposite directions at an angular speed velocity given by $\omega$. As the gears rotate, fluid is carried around the outside of the gears within the tooth spaces that are defined by the housing geometry 86. This function draws fluid into the pump on the intake side at a volumetric flow rate given by $Q_i$ 88 and expels fluid out of the pump on the discharge side at a volumetric flow rate given by $Q_d$ 90. The outside radius of the gear is 92 (addendum radius) is given by $r_a$, whereas the pitch radius 94 is shown by the symbol $r_p$. The dimension l 96 describes the instantaneous mesh length of the gear. The following equation describes the instantaneous flow rate of the pump:

$$Q_d = w(r_a^2 - r_p^2 - l^2)\omega \quad \text{(Eq. 5).}$$

Here w is the face width of the gear teeth into the paper, and $\omega$ is the angular velocity of the pump shaft. The gear-pump geometry 80 of FIG. 4 is the typical hydraulic pump found on an actuator, which provides the hydraulic pressure used by the steering system.

Figure 5:
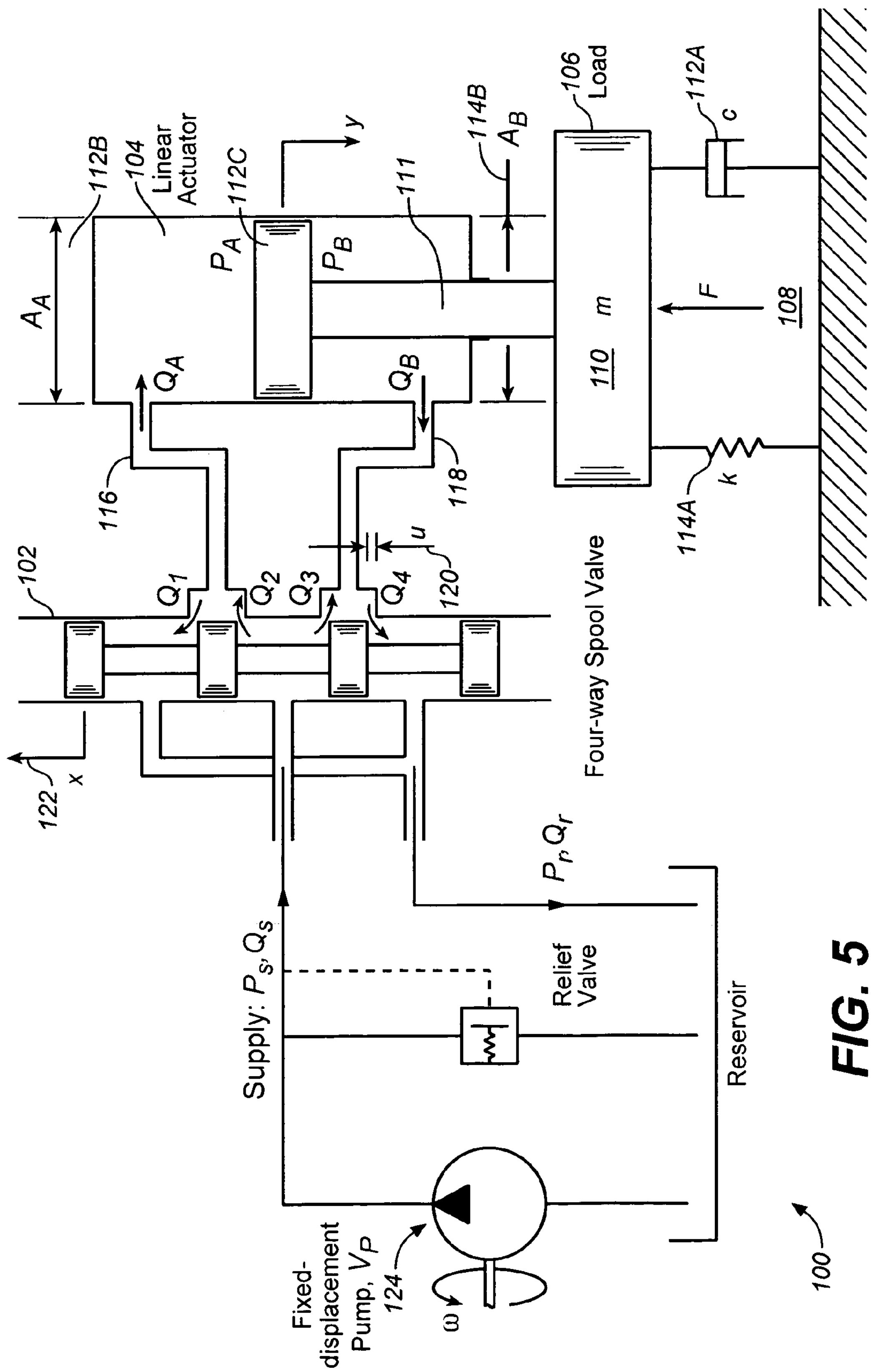
FIG. 5 (PRIOR ART)
FIG. 5 illustrates a prior art four-way valve-controlled single-rod linear actuator, that is a typical steering system.

FIG. 5 illustrates a four-way valve-controlled single-rod linear actuator 100 which is one of the most basic hydraulic control systems-a typical steering system. The system 100 uses a standard four-way valve 102 to control the output characteristics of a single-rod linear actuator 104. The load to be moved by the actuator 104 is shown as a single mass-spring-damper system 106 with a load-disturbance force given by F 108. The mass, spring rate, and viscous-drag coefficient for the load are shown in FIG. 5 by m 110, c 112, and k 114 respectively. The linear actuator 104 is shown to be constructed with a single rod 111, which is connected to both load 106 and actuator piston 112. Due to a single-rod design, the pressurized area on the top of the piston $A_A$ 112 is greater than the pressurized area on the bottom of the piston $A_B$ 114. The volumetric flow of the hydraulic fluid into $Q_A$ 116 and out $Q_B$ 118 of the actuator is controlled by the four-way control valve 102. This valve is shown to be constructed as a symmetric open-centered design with an underlapped dimension on the spool given by the dimension u 120. The displacement of the spool valve x 122 is shown to be positive in the upward direction. As the valve is moved in the positive x direction, flow to exit into side A of the actuator, which is then required flow to exit the actuator from side B. A fixed displacement pump 124 provides an adequate hydraulic pressure power source for the valve-controlled system. The pump 124 is sized according to its volumetric displacement $V_p$ and is driven by an external power source (not shown) at an angular velocity $\omega$.

The four-way valve-controlled single-rod linear actuator 100 of FIG. 5 can be used for position control of the load according to the following equation:

$$ky=\eta_{af}(A_A+A_B)K_p x-F, \quad \text{(Eq. 6)}$$

where $K_p$ is the pressure sensitivity of the control valve, $\eta_{af}$ is the force efficiency of the actuator, and the other parameters of the Eq. 6 are shown in FIG. 5. For a proportional controller, the Eq. 3 can be rewritten as follows:

$$x=K_e(y_d-y) \quad \text{(Eq. 7)}$$

where $K_e$ is the proportional gain, and $y_d$ is the desired position of the load. The most practical way to enforce the control law that is defined in Eq. 7 is to use an electro hydraulic position control for the four-way spool valve coupled with a microprocessor that is capable of reading the feedback information and generating the appropriate output signal for the valve actuator. Eqs. 6 and 7 can be combined to write the following equation of motion for the controlled system:

$$\tau\dot{y}+y=y_d. \quad \text{(Eq. 8)}$$

In this equation, the system time constant is $\tau$.

Figure 6:
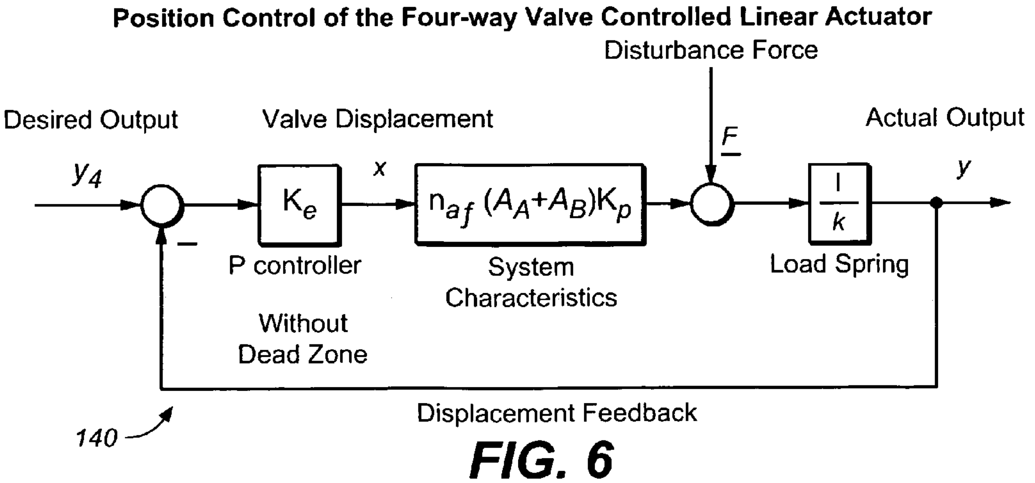
FIG. 6 (PRIOR ART)
FIG. 6 is a prior art position control diagram of the four-way valve controlled linear actuator.

FIG. 6 illustrates a position control diagram 140 of the four-way valve controlled linear actuator.

The given above discussion can be found in the book "Hydraulic Control Systems", by Noah D. Mahring, published in 2005 by John Wiley & Sons. However, the discussion of the P-controlled dynamic system given by "Hydraulic Control Systems" mostly deals with the closed loop response and does not cover dead zone compensation.

When the valve dead zone is taken into account, and if the inverse dead zone compensation is applied, Eq. 3 can be rewritten as follows:

$$u(t)=K_e\epsilon+U_{DZ}\times\text{sign}(\epsilon). \quad \text{(Eq. 9)}$$

In the presence of this significant nonlinearity, Eq. 7 can be rewritten as follows:

$$x=K_e(y_d-y)+x_{DZ}\times\text{sign}(y_d-y) \quad \text{(Eq. 10).}$$

The linear equation of motion (Eq. 8) for the controlled system (without dead zone) is not applicable in this nonlinear situation, and can not be used to accurately predict the behavior of this nonlinear system, especially around the dead zone (DZ).

Figure 7:
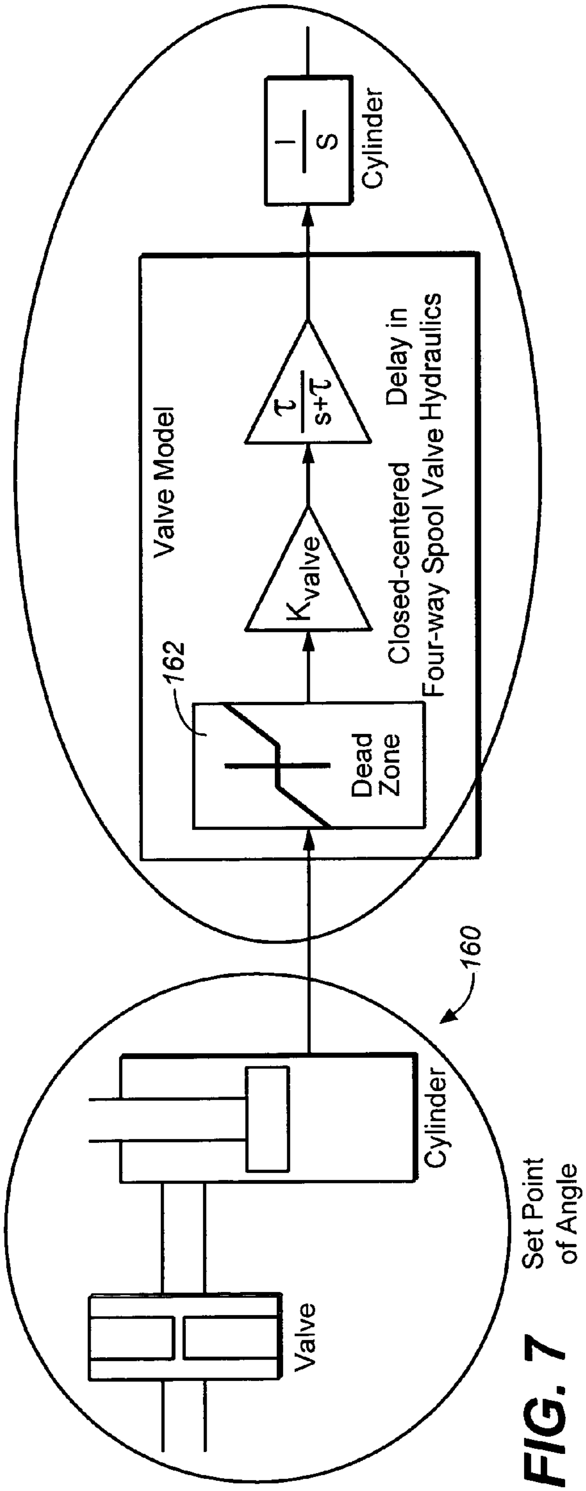
FIG. 7 (PRIOR ART)
FIG. 7 illustrates the prior art diagram of the control of the steering angle by using the four-way valve controlled linear actuator with dead zone.

The closed loop response that includes the dead zone compensation is shown in FIG. 7 that illustrates the prior art diagram 160 of the control of the steering angle by using the four-way valve controlled linear actuator with dead zone (DZ) 162.

Figure 8:
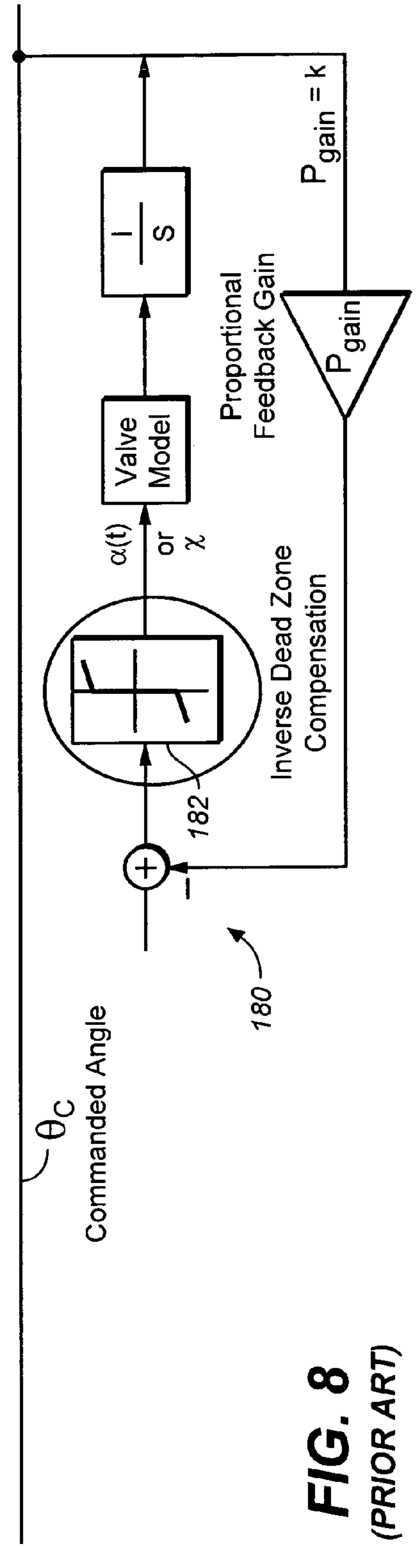
FIG. 8 (PRIOR ART)
FIG. 8 is the prior art diagram of the control of the steering angle by using the four-way valve controlled linear actuator with inverse dead zone compensation.

FIG. 8 is the prior art diagram 180 of the control of the steering angle by using the four-way valve controlled linear actuator with inverse dead zone compensation 182.

However, it is difficult to use this model as the parameters of the dead zone are unknown a priori. The present invention deals with method to calibrate hydraulic flow valves in situ. The in situ valve calibration is important because the valve response (dead band or dead zone, slope or gain, and delay) is determined not only by the valve itself, but also by a number of parameters that are not well known in advance and have to be determined in situ:

(1) load dynamics (force, or back pressure on the wheels, and mass and inertia of the wheels);

(2) hydraulic friction in hoses and hose length;

(3) tractor's pump pressure and response to load changes;

(4) temperature of hydraulic fluid (viscosity changes with temperature;

(5) other components in the steering system like the hand pump driven by the steering wheel.

For these reasons it is beneficial to calibrate the valve in situ of the vehicle, instead of calibrating the valve itself in the factory.

One aspect of the present invention is directed to a method for performing system characterization in situ for a system comprising a actuator controlled by a proportional controller.

In one embodiment of the present invention, the system includes a quasi-linear region characterized by a slope of the system response and by a delay in the quasi-linear region of the system. In one embodiment of the present invention, the system includes at least one dead zone (DZ).

In one embodiment of the present invention, the method comprises the following steps (not shown): (A) applying an input waveform U(t) to an input of the system comprising the actuator controlled by the proportional controller; (B) measuring waveform characteristics of an output waveform $\dot{X}(t)$ in a relevant region of the output waveform; wherein the relevant region of the output waveform is determined by a first set of parameters selected from the group consisting of: {a noise level; drift of the actuator; friction properties of the actuator; and characteristics of the input waveform}; (C) calculating a second set of parameters selected from the group consisting of: {at least one DZ; a system delay; and a slope of the system response in the quasi-linear region of the system} based on the measured waveform characteristics of the output waveform; and (D) performing the system characterization in situ by using the second set of calculated parameters selected from the group consisting of: {at least one DZ; the system delay; and the slope of the system response in the quasi-linear region of the system}.

In one embodiment of the present invention, the step (A) further comprises the following steps (not shown): (A1) selecting the proportional controller from the group consisting of: {an electro-hydraulic valve with a dead zone (DZ); a four-way under lapped spool valve; and an electric motor with a dead zone due to the friction of the bearings}; (A2) selecting the actuator from the group consisting of: {a linear actuator system including a linear region; and the actuator including the quasi-linear region}; and (A3) applying the input waveform U(t) to the input of the present system comprising the actuator controlled by the proportional controller.

In one embodiment of the present invention, the step (A) further comprises the following steps (not shown): (A4) providing the system selected from the group consisting of: {an implement position controlled system; and a steering system}; wherein the implement is selected from the group consisting of: {an implement of a tractor; a blade of a bulldozer; and an excavation arm}; and (A5) applying the input waveform U(t) to the input of the system.

In one embodiment of the present invention, the step (A) further comprises the following step (not shown): (A6) applying an input waveform U(t) to the input of the linear actuator system controlled by the electro-hydraulic valve with the dead-zone (DZ); wherein a period of the input waveform having the input waveform rate of changing over time is substantially greater than a system response time; and wherein the system response time is selected from the group consisting of: {a transport time delay; and a first order time delay}.

In one embodiment of the present invention, the step (A) further comprises the following step (not shown): (A7)

applying a slow changing triangle current input waveform U(t) to the input of the linear actuator system controlled by the electro-hydraulic valve with the dead zone (DZ); wherein a period of the slow changing triangle current input waveform is substantially greater than the system response time.

In one embodiment of the present invention, the step (B) further comprises the following steps (not shown): (B1) measuring waveform characteristics of the output waveform $\dot{X}$(t) in the relevant region of the output waveform; wherein the relevant region of the output waveform is determined by a first set of parameters selected from the group consisting of: {the noise level; drift of the actuator; friction properties of the actuator; and characteristics of the input waveform}; and (B2) filtering the output waveform $\dot{X}$(t) to decrease the noise level to a residual noise level; wherein the residual noise level is less than a predetermined noise level; and wherein an accuracy of the second set of calculated parameters selected from the group consisting of: {the noise level; drift of the actuator; friction properties of the actuator; and characteristics of the input waveform} is determined by the predetermined noise level.

In one embodiment of the present invention, the step (B2) further comprises the following step (not shown): (B2, 1) using a low pass filter having a low pass filter time response.

In one embodiment of the present invention, the step (B) further comprises the following step (not shown): (B3) determining a relevant zone for measurements by setting a set of predetermined thresholds based on preliminary measurements of a third set of parameters selected from the group consisting of: {the level of residual noise; the drift; the friction properties; the system response time; the filter time response; and the characteristics of the input waveform}.

In one embodiment of the present invention, the (B3) further comprises the following step (not shown): (B3, 1) setting a low threshold level; wherein the low threshold level is determined by a fourth set of parameters selected from the group consisting of: {the level of residual noise; the drift; and position disturbances}.

In one embodiment of the present invention, the (B3) further comprises the following step (not shown): (B3, 2) setting a high threshold level; wherein the high threshold level is determined by a fifth set of parameters selected from the group consisting of: {a slope of the input waveform; the system response time; the filter time response; and a residual noise level of the input waveform}.

Figure 9:
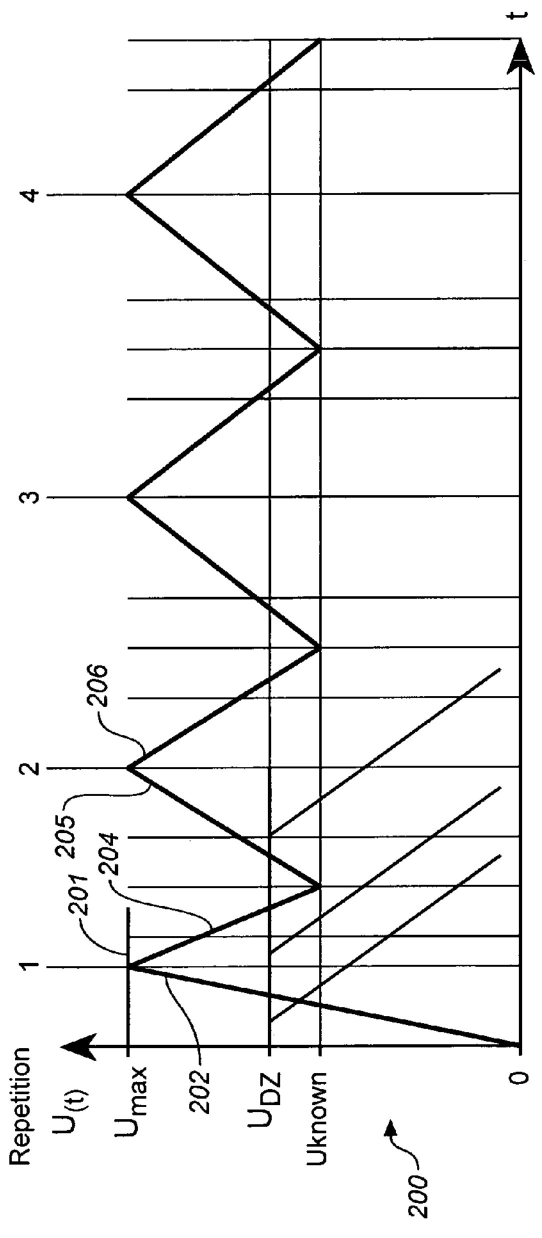
FIG. 9 illustrates the application of the measurement algorithm $\aleph$ of the present invention.

In one embodiment of the present invention, wherein the system comprises a linear actuator controlled by an electro-hydraulic valve, FIG. 9 is a diagram 200 that illustrates the application of the measurement algorithm ℵ of the present invention.

In one embodiment of the present invention, the measurement algorithm ℵ of the present invention comprises the following steps (D-L): (D) determining limits $\dot{X}_{min}$ and $\dot{X}_{MAX}$ on the output waveform $\dot{X}$(t) based on a sixth set of parameters selected from the group consisting of: {a noise level; drift; measured filter time constant; and a group delay}; (E) applying a substantially slow input waveform with a slope ΔU/Δt (202) to an input of the valve; wherein the substantially slow input waveform comprises a linearly increasing substantially slow ramp waveform; and wherein the linearly increasing substantially slow ramp waveform is substantially slow comparatively to a hydraulic response time and to a filter time constant; and wherein the input waveform includes a maximum $U_{max}$ and a minimum $U_{min}$; (F) filtering the input waveform U(t) and the output waveform X (t) to obtain a filtered output waveform <$\dot{X}$(t)> and a filtered input waveform <U(t)>; (G) if the filtered <$\dot{X}$(t)> goes above the $\dot{X}_{MIN}$, storing the filtered <$\dot{X}$(t)> and the filtered <U(t)> until the filtered <$\dot{X}$(t)> goes above the $\dot{X}_{MAX}$; (H) applying a substantially slow input waveform with a slope (−)ΔU/Δt (204) to the input of the valve; wherein the substantially slow input waveform comprises a linearly decreasing substantially slow ramp waveform; and wherein the linearly decreasing substantially slow ramp waveform is substantially slow comparatively to the hydraulic response time and to the filter time constant; (I) if the <$\dot{X}$(t)> goes below $\dot{X}_{MAX}$, storing the filtered <$\dot{X}$(t)> and the filtered <U(t)> until the filtered <$\dot{X}$(t) goes below $\dot{X}_{MIN}$; and (K) fitting a first line (205) to the stored filtered <$\dot{X}$(t)> and fitting a second line (206) to the stored filtered <U(t)> to measure waveform characteristics of the filtered <$\dot{X}$(t)> output waveform and the filtered <U(t)>; wherein the first fitting line is selected from the group consisting of: {an over determined linear regression; a critically determined two-point line fit}; and wherein the second fitting line is selected from the group consisting of: {an over determined linear regression; a critically determined two-point line fit}.

Figure 10:
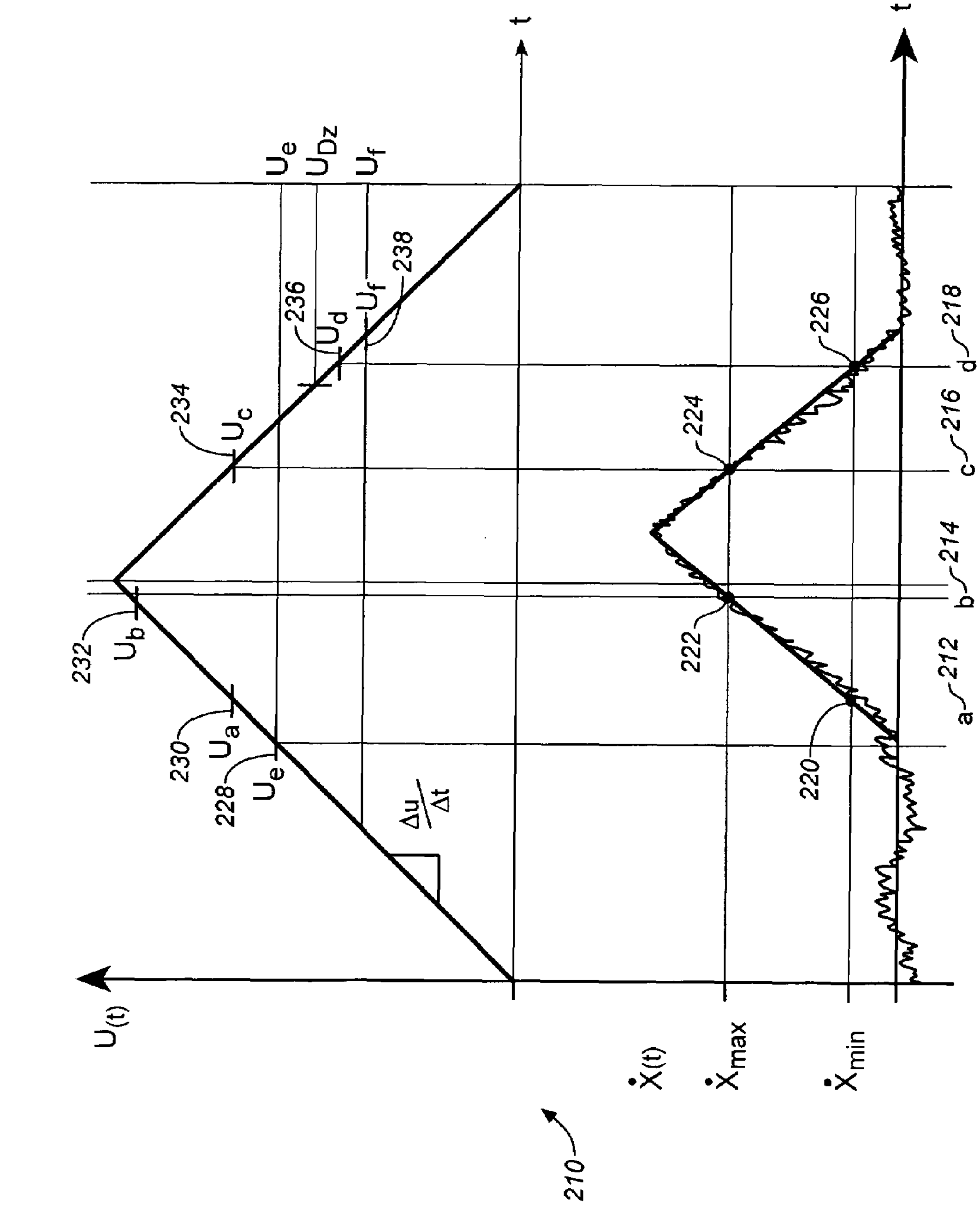
FIG. 10 shows the calculation of the dead zone parameter, the system delay, and the slope of the system response in the linear region of the system for the purposes of the present invention.

In one embodiment of the present invention, FIG. 10 is a diagram 210 that illustrates the step (L) of the measurement algorithm ℵ of the present invention. More specifically, the diagram 210 illustrates an example of the calculation of the dead zone parameter $U_{DZ}$, the calculation of the system delay τ; and the calculation of the slope of the system response Δẋ/Δu in the linear region of the system based on the measured waveform characteristics of the filtered output waveform and the filtered input waveform.

Using two-point critically determined line fits one should make the following measurements at management points a 212, b 214, c 216, and d 218 as shown in FIG. 10. To obtain the equation for the average slope, one has to obtain $S_1$(slope $\overline{ab}$) and $S_2$ (slope $\overline{cd}$):

$$S_1(\text{slope } \overline{ab}) = \frac{\dot{x}_{\max} - \dot{x}_{\min}}{u_b - u_a} \quad \text{(Eq. 11)}$$

$$S_2(\text{slope } \overline{cd}) = \frac{\dot{x}_{\max} - \dot{x}_{\min}}{u_c - u_d} \quad \text{(Eq. 12)}$$

The average slope is given by the following equation:

$$S\left(\text{or } \frac{\Delta\dot{x}}{\Delta u}\right) = \frac{S_1 + S_2}{2}. \quad \text{(Eq. 13)}$$

Similarly, to obtain the equation for the dead zone parameter, one has to obtain:

$$u_e = u_a - \frac{\dot{x}_{\min}}{S} \quad \text{(Eq. 14)}$$

$$u_f = u_d - \frac{\dot{x}_{\min}}{S} \quad \text{(Eq. 15)}$$

The dead zone parameter can be obtained form the following equation:

$$u_{DZ} = \frac{u_e + u_f}{2}. \quad \text{(Eq. 16)}$$

Finally, the delay $\tau$ can be obtained from the following equation:

$$\tau = \frac{u_e - u_f}{2 \times \frac{\Delta u}{\Delta t}}. \quad \text{(Eq. 17)}$$

Figure 11:
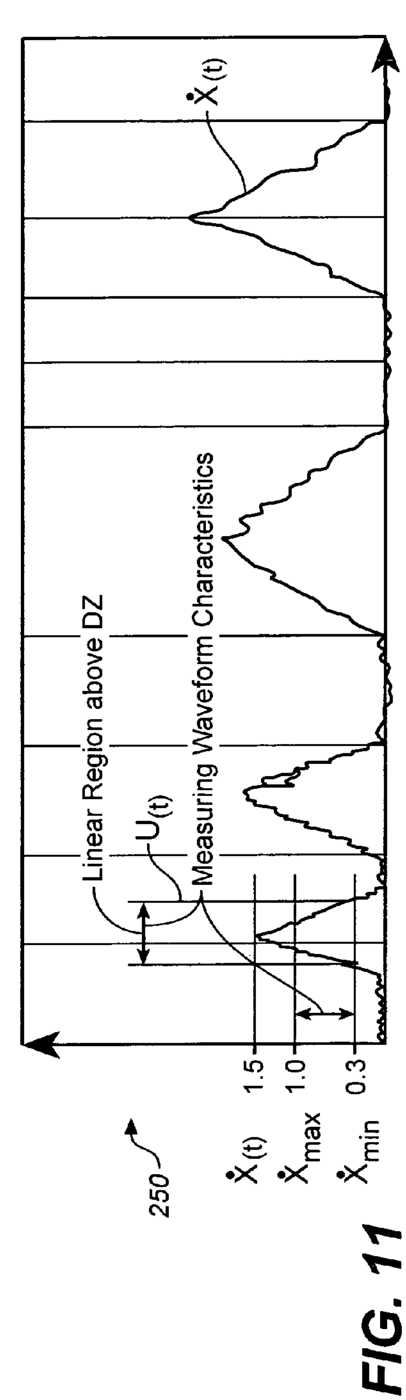
FIG. 11 illustrates how to modify the algorithm $\aleph$ by adaptively changing parameters of the ramp waveform applied to an input of the valve for the purposes of the present invention.

In one embodiment of the present invention, FIG. 11 illustrates how to modify the algorithm $\aleph$ by adaptively changing $u_{max}$ and $u_{min}$ of the ramp waveform with the slope $\Delta u/\Delta t$ applied to an input of the valve.

More specifically, for example, at the fast cycle ($\Delta u/\Delta t$ =5 units/sec), one has to compute the dead zone parameter $u_{DZ1}$ between $u_{min}$=0 and $u_{max}$=u($\dot{x}$=1.5). The obtained dead zone parameter $u_{DZ1}$ is used at the next (slow) cycle ($\Delta u/\Delta t$=2 units/sec) as follows: one has to compute the dead zone parameter $u_{DZ2}$ between $u_{min}$=$u_{DZ1}$−5 and $u_{max}$=u($\dot{x}$=1.5). $u_{max}$=u($\dot{x}$=1.5). The obtained dead zone parameter $u_{DZ2}$ is used at the second (slow) cycle ($\Delta u/\Delta t$=2 units/sec) as follows: one has to compute the dead zone parameter $u_{DZ3}$ between $u_{min}$=$u_{DZ2}$−5 and $u_{max}$=u($\dot{x}$=1.5).

Another aspect of the present invention is directed to an apparatus for performing system characterization in situ for a system comprising a actuator controlled by a proportional controller.

In one embodiment, the apparatus of the present invention comprises (not shown): a means (A) for applying an input waveform U(t) to an input of the system comprising the actuator controlled by the proportional controller; a means (B) for measuring waveform characteristics of an output waveform $\dot{X}$(t) in a relevant region of the output waveform; wherein the relevant region of the output waveform is determined by a first set of parameters selected from the group consisting of: {a noise level; a drift of the actuator; friction properties of the actuator; and characteristics of the input waveform}; a means (C) for calculating a second set of parameters selected from the group consisting of: {at least one DZ; a system delay; and a slope of the system response in the quasi-linear region of the system} based on the measured waveform characteristics of the output waveform; and a means (D) for performing the system characterization in situ by using the second set of calculated parameters selected from the group consisting of: {at least one DZ; the system delay; and the slope of the system response in the quasi-linear region of the system}.

In one embodiment of the present invention, the means (A) further comprises (not shown): a means (A1) for selecting the proportional controller from the group consisting of: {an electro-hydraulic valve with a dead zone (DZ); a four-way under lapped spool valve; and an electric motor with a dead zone due to the friction of the bearings}; a means (A2) for selecting the actuator from the group consisting of: {a linear actuator system including a linear region; and the actuator including the quasi-linear region}; and a means (A3) for applying the input waveform U(t) to the input of the system comprising the actuator controlled by the proportional controller.

In one embodiment of the present invention, the means (A) further comprises: a means (A4) for selecting the system from the group consisting of: {an implement position controlled system; and a steering system}; a means (A5) for selecting the implement from the group consisting of: {an implement of a tractor; a blade of a bulldozer; and an excavation arm}; and a means (A6) for applying the input waveform U(t) to the input of the system.

In one embodiment of the present invention, the means (A) further comprises: a means (A7) for applying an input waveform U(t) to the input of the linear actuator system controlled by the electro-hydraulic valve with the dead-zone (DZ); wherein a period of the input waveform having the input waveform rate of changing over time is substantially greater than a system response time; and wherein the system response time is selected from the group consisting of: {a transport time delay; and a first order time delay}.

In one embodiment of the present invention, the means (A) further comprises: a means (A8) for applying a slow changing triangle current input waveform U(t) to the input of the linear actuator system controlled by the electro-hydraulic valve with the dead zone (DZ); wherein a period of the slow changing triangle current input waveform is substantially greater than the system response time.

In one embodiment of the present invention, the means (B) further comprises: a means (B1) for measuring waveform characteristics of the output waveform $\dot{X}$(t) in the relevant region of the output waveform; wherein the relevant region of the output waveform is determined by a first set of parameters selected from the group consisting of: {the noise level; drift of the actuator; friction properties of the actuator; and characteristics of the input waveform}; and a means (B2) for filtering the output waveform $\dot{X}$(t) to decrease the noise level to a residual noise level; wherein the residual noise level is less than a predetermined noise level.

In one embodiment of the present invention, the means (B2) further comprises: (B2, 1) a low pass filter having a low pass filter time response.

In one embodiment of the present invention, the means (B) further comprises: a means (B3) for determining a relevant zone for measurements by setting a set of predetermined thresholds based on preliminary measurements of a third set of parameters selected from the group consisting of: {the level of residual noise; the drift; the friction properties; the system response time; the filter time response; and the characteristics of the input waveform}.

In one embodiment of the present invention, the means (B3) further comprises: a means (B3, 1) for setting a low threshold level; wherein the low threshold level is determined by a fourth set of parameters selected from the group consisting of: {the level of residual noise; the drift; and position disturbances}.

In one embodiment of the present invention, the means (B3) further comprises: a means (B3, 2) for setting a high threshold level; wherein the high threshold level is determined by a fifth set of parameters selected from the group consisting of: {a slope of the input waveform; the system response time; the filter time response; and a residual noise level of the input waveform}.

The foregoing description of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for performing system characterization in situ for a system comprising an actuator controlled by a proportional controller, said system further comprising a measurement system configured to measure said actuator position rate, said system including at least one dead zone (DZ); said method comprising the steps of:

(A) applying an input waveform U(t) to an input of said system, said system characterized by a quasi-linear transfer function relating said proportional controller input to said actuator rate of motion, wherein there is a delay between time of input of said proportional controller action and time of said actuator response in a quasi-linear region;

(B) measuring waveform characteristics of an output waveform $\dot{X}(t)$ taken from said measurement system in a relevant region of said output waveform; wherein said relevant region of said output waveform is determined by a first set of parameters selected from the group consisting of: {a noise level; drift of said actuator; friction properties of said actuator; and characteristics of said input waveform};

(C) calculating a second set of parameters selected from the group consisting of: {at least one DZ; a system delay; and a slope of said system response in said quasi-linear region of said system} based on said measured waveform characteristics of said output waveform;

and (D) performing said system characterization in situ by using said second set of calculated parameters selected from the group consisting of: {at least one DZ; said system delay; and said slope of said system response in said quasi-linear region of said system} in order to accurately predict the behavior of said system comprising said actuator controlled by said proportional controller around said at least one dead zone DZ.

2. The method of claim 1, wherein said step (A) further comprises the steps of:

(A1) selecting said proportional controller from the group consisting of: {an electro-hydraulic valve with a dead zone (DZ); a four-way under-lapped spool electro-hydraulic valve; and an electric motor with a (DZ) dead zone due to friction of the bearings};

(A2) selecting said actuator from the group consisting of: {a linear actuator system including a linear region; and a hydraulic motor including a linear-motion cylinder};

and (A3) applying said input waveform U(t) to said input of said system comprising said actuator controlled by said proportional controller.

3. The method of claim 1, wherein said step (A) further comprises the steps of:

(A4) providing said system comprising said actuator controlled by said proportional controller; said system selected from the group consisting of: {an implement position controlled system; and a steering system}; and wherein said implement is selected from the group consisting of: {an implement of a tractor; a blade of a bulldozer; and an excavation arm};

and (A5) applying said input waveform U(t) to said input of said system comprising said actuator controlled by said proportional controller.

4. The method of claim 1, wherein said step (A) further comprises the step of:

(A6) applying an input waveform U(t) having a input waveform rate of changing over time to said input of said linear actuator system controlled by said electro-hydraulic valve with said dead-zone (DZ); wherein a period of said input waveform having said input waveform rate of changing over time is substantially greater than a system response time; and wherein said system response time is selected from the group consisting of: {a transport time delay; and a first order time delay}.

5. The method of claim 1, wherein said step (A) further comprises the step of:

(A7) applying a slow changing triangle current input waveform U(t) to said input of said linear actuator system controlled by said electro-hydraulic valve with said dead zone (DZ); wherein a period of said slow changing triangle current input waveform is substantially greater than said system response time.

6. The method of claim 1, wherein said step (B) further comprises the steps of:

(B1) measuring waveform characteristics of said output waveform $\dot{X}(t)$ in said relevant region of said output waveform; wherein said relevant region of said output waveform is determined by a first set of parameters selected from the group consisting of: {said noise level; drift of said actuator; friction properties of said actuator; and characteristics of said input waveform};

and (B2) filtering said output waveform $\dot{X}(t)$ to decrease said noise level to a residual noise level; wherein said residual noise level is less than a predetermined noise level; and wherein an accuracy of said second set of calculated parameters selected from the group consisting of: {said noise level; drift of said actuator; friction properties of said actuator; and characteristics of said input waveform} is determined by said predetermined noise level.

7. The method of claim 6, wherein said step (B2) further comprises the step of:

(B2, 1) using a low pass filter having a low pass filter time response.

8. The method of claim 1, wherein said step (B) of measuring waveform characteristics of said output waveform $\dot{X}(t)$ in said relevant region of said output waveform further comprises the step of:

(B3) determining a relevant zone for measurements by setting a set of predetermined thresholds based on preliminary measurements of a third set of parameters selected from the group consisting of: {said level of residual noise; said drift; said friction properties; said system response time; said filter time response; and said characteristics of said input waveform}.

9. The method of claim 8, wherein said step (B3) further comprises the step of:

(B3, 1) setting a low threshold level; wherein said low threshold level is determined by a fourth set of parameters selected from the group consisting of: {said level of residual noise; said drift; and position disturbances}.

10. The method of claim 8, wherein said step (B3) further comprises the step of:

(B3, 2) setting a high threshold level; wherein said high threshold level is determined by a fifth set of parameters selected from the group consisting of: {a slope of said input waveform; said system response time; said filter time response; and a residual noise level of said input waveform}.

11. The method of claim 1, wherein said system comprises a linear actuator controlled by an electro-hydraulic valve, said method further comprising the steps (D-L) of the following algorithm $\aleph$:

(D) determining limits $\dot{X}_{min}$ and $\dot{X}_{MAX}$ on said output waveform $\dot{X}(t)$ based on a sixth set of parameters selected from the group consisting of: {noise level; drift; measured filter time constant; and a group delay};

(E) applying a substantially slow input waveform with a slope $\Delta U/\Delta t$ to an input of said valve; wherein said substantially slow input waveform comprises a linearly increasing substantially slow ramp waveform; and wherein said linearly increasing substantially slow ramp waveform is substantially slow comparatively to a hydraulic response time and to a filter time constant; and wherein said input waveform includes a maximum $U_{max}$ and a minimum $U_{min}$; (F) filtering said input waveform U(t) and said output waveform $\dot{X}(t)$ to obtain a filtered output waveform $<\dot{X}(t)>$ and a filtered input waveform $<U(t)>$;

(G) if said filtered $<\dot{X}(t)>$ goes above said $\dot{X}_{MIN}$, storing said filtered $<\dot{X}(t)>$ and said filtered $<U(t)>$ until said filtered $<\dot{X}(t)>$ goes above said $\dot{X}_{MAX}$;

(H) applying a substantially slow input waveform with a slope (−) $\Delta U/\Delta t$ to said input of said valve; wherein said substantially slow input waveform comprises a linearly decreasing substantially slow ramp waveform; and wherein said linearly decreasing substantially slow ramp waveform is substantially slow comparatively to said hydraulic response time and to said filter time constant;

(I) if said $<\dot{X}(t)>$ goes below said $\dot{X}_{MAX}$, storing said filtered $<\dot{X}(t)>$ and said filtered $<U(t)>$ until said filtered $<\dot{X}(t)>$ goes below said $\dot{X}_{MIN}$;

(K) fitting a first line to said stored filtered $<\dot{X}(t)>$ and fitting a second line to said stored filtered $<U(t)>$ to measure waveform characteristics of said filtered $<\dot{X}(t)>$ output waveform and said filtered $<U(t)>$; wherein said first fitting line is selected from the group consisting of: {an over determined linear regression; a critically determined two-point line fit}; and wherein said second fitting line is selected from the group consisting of: {an over determined linear regression; a critically determined two-point line fit};

and (L) based on said measured waveform characteristics of said filtered $<\dot{X}(t)>$ output waveform and said filtered $<U(t)>$, calculating said second set of parameters selected from the group consisting of: {said DZ; said system delay; and said slope of said system response in said linear region of said system} to perform said system characterization in situ.

12. The method of claim 11 further comprising the step of:

(M) applying said steps (D-L) of said algorithm X to each input of said controller.

13. The method of claim 12 further comprising the step of:

(N) combining said results obtained in said step (M).

14. The method of claim 11 further comprising the steps of:

(O) applying integer N times steps (D-L) of said algorithm $\aleph$ to each input of said controller;

and (P) averaging said results obtained in said step (O).

15. The method of claim 11 further comprising the step of:

(R) modifying said algorithm $\aleph$ by adaptively changing said $U_{max}$ and said $U_{min}$ of said ramp waveform with said slope $\Delta U/\Delta t$ applied to said input of said valve based on results obtained in said claim 11.

16. An apparatus for performing system characterization in situ for a system comprising a actuator controlled by a proportional controller, said system including a quasi-linear region characterized by a slope of said system response and by a delay in said quasi-linear region of said system; said system including at least one dead zone (DZ); said apparatus comprising:

(A) a means for applying an input waveform U(t) to an input of said system comprising said actuator controlled by said proportional controller;

(B) a means for measuring waveform characteristics of an output waveform $\dot{X}(t)$ in a relevant region of said output waveform; wherein said relevant region of said output waveform is determined by a first set of parameters selected from the group consisting of: {a noise level; a drift of said actuator; friction properties of said actuator; and characteristics of said input waveform};

(C) a means for calculating a second set of parameters selected from the group consisting of: {at least one DZ; a system delay; and a slope of said system response in said quasi-linear region of said system} based on said measured waveform characteristics of said output waveform;

and (D) a means for performing said system characterization in situ by using said second set of calculated parameters selected from the group consisting of: {at least one DZ; said system delay; and said slope of said system response in said quasi-linear region of said system}.

17. The apparatus of claim 16, wherein said means (A) further comprises:

(A1) a means for selecting said proportional controller from the group consisting of: {an electro-hydraulic valve with a dead zone (DZ); a four-way under lapped spool valve; and an electric motor with a dead zone due to the friction of the bearings};

(A2) a means for selecting said actuator from the group consisting of: {a linear actuator system including a linear region; and said actuator including said quasi-linear region};

and (A3) a means for applying said input waveform U(t) to said input of said system comprising said actuator controlled by said proportional controller.

18. The apparatus of claim 16, wherein said means (A) further comprises:

(A4) a means for selecting said system from the group consisting of: {an implement position controlled system; and a steering system};

(A5) a means for selecting said implement from the group consisting of: {an implement of a tractor; a blade of a bulldozer; an excavation arm};

and (A6) a means for applying said input waveform U(t) to said input of said system.

19. The apparatus of claim 16, wherein said means (A) further comprises:

(A7) a means for applying an input waveform U(t) to said input of said linear actuator system controlled by said electro-hydraulic valve with said dead-zone (DZ); wherein a period of said input waveform having said input waveform rate of changing over time is substantially greater than a system response time; and wherein said system response time is selected from the group consisting of: {a transport time delay; and a first order time delay}.

20. The apparatus of claim 16, wherein said means (A) further comprises:

(A8) a means for applying a slow changing triangle current input waveform U(t) to said input of said linear actuator system controlled by said electro-hydraulic valve with said dead zone (DZ); wherein a period of said slow changing triangle current input waveform is substantially greater than said system response time.

21. The apparatus of claim 16, wherein said means (B) further comprises:

(B1) a means for measuring waveform characteristics of said output waveform $\dot{X}(t)$ in said relevant region of said output waveform; wherein said relevant region of said output waveform is determined by a first set of parameters selected from the group consisting of: {said noise level; drift of said actuator; friction properties of said actuator; and characteristics of said input waveform};

and (B2) a means for filtering said output waveform $\dot{X}(t)$ to decrease said noise level to a residual noise level; wherein said residual noise level is less than a predetermined noise level.

22. The apparatus of claim 21, wherein said means (B2) further comprises:

(B2, 1) a low pass filter having a low pass filter time response.

23. The apparatus of claim 16, wherein said means (B) further comprises:

(B3) a means for determining a relevant zone for measurements by setting a set of predetermined thresholds based on preliminary measurements of a third set of parameters selected from the group consisting of: {said level of residual noise;

said drift; said friction properties; said system response time; said filter time response; and said characteristics of said input waveform}.

24. The apparatus of claim 23, wherein said means (B3) further comprises:

(B3, 1) a means for setting a low threshold level; wherein said low threshold level is determined by a fourth set of parameters selected from the group consisting of: {said level of residual noise; said drift; and position disturbances}.

25. The apparatus of claim 23, wherein said means (B3) further comprises:

(B3, 2) a means for setting a high threshold level; wherein said high threshold level is determined by a fifth set of parameters selected from the group consisting of: {a slope of said input waveform; said system response time; said filter time response; and said residual noise level of said input waveform}.

26. A computer-readable storage medium useful in association with a chip, said chip having a processor and memory, said chip is configured to perform system characterization in situ for a system comprising a actuator controlled by a proportional controller, said system including a quasi-linear region characterized by a slope of said system response and by a delay in said quasi-linear region of said system; said system including at least one dead zone (DZ); said computer-readable storage medium including computer-readable code instructions configured to cause said processor to execute the steps of:

(A) applying an input waveform U(t) to an input of said system comprising said actuator controlled by said proportional controller;

(B) measuring waveform characteristics of an output waveform $\dot{X}(t)$ in a relevant region of said output waveform; wherein said relevant region of said output waveform is determined by a first set of parameters selected from the group consisting of: {a noise level; drift of said actuator; friction properties of said actuator; and characteristics of said input waveform};

and (C) based on said measured waveform characteristics of said output waveform, calculating a second set of parameters selected from the group consisting of: {at least one DZ; a system delay; and a slope of said system response in said quasi-linear region of said system};

wherein said second set of calculated parameters selected from the group consisting of: {at least one DZ; said system delay; and said slope of said system response in said quasi-linear region of said system} is used to perform said system characterization in situ.

27. A computer program product that includes a computer-readable medium having a sequence of instructions which, when executed by a processor, causes the processor to execute a process for performing system characterization in situ for a system comprising a actuator controlled by a proportional controller, said system including a quasi-linear region characterized by a slope of said system response and by a delay in said quasi-linear region of said system; said system including at least one dead zone (DZ); the process comprising:

(A) applying an input waveform U(t) to an input of said system comprising said actuator controlled by said proportional controller;

(B) measuring waveform characteristics of an output waveform $\dot{X}(t)$ in a relevant region of said output waveform; wherein said relevant region of said output waveform is determined by a first set of parameters selected from the group consisting of: {a noise level; drift of said actuator; friction properties of said actuator; and characteristics of said input waveform};

and (C) based on said measured waveform characteristics of said output waveform, calculating a second set of parameters selected from the group consisting of: {at least one DZ; a system delay; and a slope of said system response in said quasi-linear region of said system};

wherein said second set of calculated parameters selected from the group consisting of: {at least one DZ; said system delay; and said slope of said system response in said quasi-linear region of said system} is used to perform said system characterization in situ.

* * * * *